United States Patent
Kim et al.

(10) Patent No.: US 11,785,896 B2
(45) Date of Patent: Oct. 17, 2023

(54) ECO-FRIENDLY HOT STEAM SOIL STERILIZER WITH SOIL SHREDDER

(71) Applicant: Yoo Shin Kim, Daegu (KR)

(72) Inventors: Yoo Shin Kim, Daegu (KR); Young Hwan Kim, Daegu (KR); Steven A. Fennimore, Salinas, CA (US); Suk Kyu Song, Daegu (KR)

(73) Assignee: Yoo Shin Kim, Daegu (KR)

( * ) Notice: Subject to any disclaimer, the term of this patent is extended or adjusted under 35 U.S.C. 154(b) by 0 days.

(21) Appl. No.: 17/527,931

(22) Filed: Nov. 16, 2021

(65) Prior Publication Data
US 2022/0167568 A1 Jun. 2, 2022

(30) Foreign Application Priority Data
Nov. 17, 2020 (KR) .......................... 10-2020-0154557

(51) Int. Cl.
*A01G 11/00* (2006.01)
*A01M 1/20* (2006.01)
*A01M 21/04* (2006.01)

(52) U.S. Cl.
CPC ........... *A01G 11/00* (2013.01); *A01M 1/2094* (2013.01); *A01M 21/04* (2013.01)

(58) Field of Classification Search
CPC ..... A01G 11/00; A01M 3/007; A01M 1/2094; A01M 21/04; A01M 19/00
USPC ................................................. 43/132.1, 124
See application file for complete search history.

(56) References Cited

U.S. PATENT DOCUMENTS

| | | | |
|---|---|---|---|
| 6,655,082 B1* | 12/2003 | Paltin | A01G 11/00 47/1.42 |
| 9,765,127 B2* | 10/2017 | Kim | A01M 19/00 17/2 |
| 9,795,127 B2 | 10/2017 | Kim | |
| 2012/0216445 A1* | 8/2012 | Aquilina | A01M 7/00 43/132.1 |
| 2015/0128483 A1* | 5/2015 | Krupp | F24H 3/02 3/25 |
| 2021/0321600 A1* | 10/2021 | Gleim | A01M 3/00 3/7 |

FOREIGN PATENT DOCUMENTS

| | | |
|---|---|---|
| KR | 10-1498904 | 3/2015 |
| KR | 10-1498905 | 3/2015 |
| KR | 10-1898016 | 9/2018 |
| WO | 2018008886 A2 | 1/2018 |

* cited by examiner

*Primary Examiner* — Joshua J Michener
*Assistant Examiner* — Henry Hooper Mudd
(74) *Attorney, Agent, or Firm* — Maschoff Brennan

(57) ABSTRACT

Disclosed is a mechanical technology that kills parasitic pests, harmful bacteria and weed seeds in the soil by using high-temperature steam while moving forward by using a caterpillar with a self-powered device in order to smoothly perform the eco-friendly high-temperature steam soil disinfection in all types of soils, such as clays and sandy soils, having suitable moisture content; a mechanical technology in which the steam boiler is operated with power of an A/C generator to produce steam the steam is supplied to the re-heater installed on an upper portion of a nozzle through a high-pressure steam hose to increase the steam temperature to reheat the steam with high-temperature dry steam, thereby increasing the efficiency and effectiveness of high-temperature steam soil disinfection.

3 Claims, 4 Drawing Sheets

ECO-FRIENDLY HOT STEAM SOIL STERILIZER WITH SOIL SHREDDER

TECHNICAL FIELD

The present invention relates to insecticide, sterilization, and extinction of pests, harmful bacteria and weed seeds that parasitize in greenhouse soil and outdoor soil. Even in developed agricultural countries, most of the soil disinfected with chemical pesticides after tillage work with the existing tractor causes that natural environments are destroyed, and repeated cultivation damage due to heavy metals accumulated in the soil causes that the rural economy is deteriorated and the health of farmers who produce agricultural products and consumers are enormously damaged.

The present invention is the technology researched and developed such that the existing difficult method and procedure for eco-friendly high-temperature steam soil disinfection are integrated into one system to completely sterilize the soil.

According to the research and development machine technology, a generator is activated to produce electric energy to drive a caterpillar by using a self-powered device, the generated electricity is used to operate a boiler to produce steam, and high-temperature steam is sprayed from, through a re-heater, a steam outlet of a nozzle in the soil to heat the soil, so as to smoothly perform the high-temperature steam soil disinfection in clay soil and sandy soil. According to the research and development machine technology, a cockpit is equipped with a monitor for checking a status of disinfection work of the entire soil sterilizer via a video monitor and analyzing the disinfection status according to the depth of the soil by using a soil depth-specific temperature monitor installed in a needle rod, the soil particles are crushed into small pieces by using a saw blade type crusher, the nozzle protected by the needle rod sprays high-temperature steam from deep in the crushed soil to allow the high-temperature steam to quickly penetrate into the soil while rising upward, the nozzle protected by the needle rod moves forward while discharging the high-temperature steam in the soil to preserve the temperature of the soil and kills pests, harmful bacteria and weed seeds, and a hydraulic folding cover to make banded steam to maintain the temperature for a predetermined period of time, so that the disinfection effect is increased.

BACKGROUND ART

The method of disinfecting the soil may cause a large difference in the amount of harvest of crops and the quality of produced agricultural products. When the soil disinfection is conducted with chemical pesticides and herbicides, the natural environments and animals, especially human beings, are helplessly damaged.

Europe, the advanced agricultural country, and Japan, the neighboring country have invested a lot of human resources and money in research on high-temperature steam soil disinfection for more than 100 years and 60 years, respectively to prevent the devastation of soil and protect the natural environment. However, Dr. Steven Fennimore of UC Davis University in United States of America, who has analyzed the performance and effectiveness of the world steam soil sterilizer for the past 10 years, said that even recently the self-powered steam soil sterilizer is not at the technological stage to commercialize.

According to the present invention, the difference between the amount of harvest of agricultural products in the area disinfected with chemical pesticides, and the amount of harvest with steam disinfection may be at least 50%, and the time and cost for the soil disinfection may be saved. Whereas the chemical pesticides are required to be sprayed several times a year, the soil sterilization with high-temperature steam is solved about once every three years, thereby serving as a research and development machine technology with a low-cost and high-efficiency to protect the natural environment and people's health.

(Patent Document 1) Korean Patent Registration No. 10-1898016 titled by STEAM TYPE SOIL STERILIZER MACHINE WITH A TILLAGE OPERATION FUNCTION (Patent document 2) Korean Patent Registration No. 10-1498904 titled by INSECTICIDAL AND DISINFECTION APPARATUS USING ELECTROSHOCK AND STEAM INFUSION (Patent document 3) Korean Patent Registration No. 10-1498905 titled by APPARATUS AND METHOD FOR STEAM-TYPE INSECTICIDAL STERILIZATION (Patent document 4) U.S. Pat. No. 9,795,127 B2 titled by STEAM TYPE PEST EXTERMINATION APPARATUS

DISCLOSURE

Technical Problem

Accordingly, an object of the present technology is configured such that it is economical and eco-friendly and the current method, in which the existing spraying of chemical pesticides, herbicides and the like and the soil disinfection with poison gas fumigation flow into the air needed for human breathing and the groundwater and river water for human drinking, is solved to protect the natural environment and the health of farmers and consumers from chemical pesticides sprayed indefinitely, so that healthy agricultural products are produced in healthy soil to protect the natural environment and provide healthy food to consumers.

Technical Solution

According to the above object, the present technology used for killing pests, harmful bacteria and weed seeds will be described with reference with a perspective view of the high-temperature steam soil sterilizer in FIG. 1 and a layout diagram in FIG. 2.

FIG. 2 shows a cockpit (2-1), a generator (5-1), an electric steam boiler (5-3), and a water tank (3-1), wherein water inside the water tank (3-1) is introduced into the electric steam boiler (5-3) by using a water pump (3-1-1).

The high-temperature steam produced in the electric steam boiler (5-3) is introduced into a re-heater (5-4) through a high-pressure steam hose (5-3-5), and then the high-temperature steam is reheated.

A saw blade type crusher (6-1) is a device for increasing the disinfection rate by breaking the soil into small pieces to allow the high-temperature steam to quickly permeate between the soils. A needle rod (7-1) serves to protect a nozzle (7-2), and moves forward while spraying the high-temperature steam from a steam outlet (7-2-1) in the state of being inside the soil to increase the disinfection effect of high-temperature steam. A cover (8-1) is used to form banded steam to maintain the temperature of the soil heated by the sprayed high-temperature steam for a predetermined period of time.

Advantageous Effects

The present technology is a technology configured to protect the natural environment and the people's health from chemical pesticides and increase the amount of harvest by reducing the repeated cultivation damage by reducing the heavy metal accumulated in the soil that lowers the amount of harvest of agricultural products around the world. According to the report published by the Ministry of Agriculture and Forestry of Korea in 2014, 2 tons of tomatoes are produced in the same area in the Netherlands that performs heat disinfection when assuming that the production amount of tomatoes is 1 ton in Korea that disinfects the soil with chemical pesticides. The Netherlands having half of Korea's land area ranked second after the United States in world agricultural exports in 2018. The agricultural technology is required to be learned and may be the unexplored field so far. The era of imitating other technologies has gone. The technologies are required to be researched and developed to have high technical skills and then released to the global market.

Accordingly, the re-heater technology, which is not developed in European technology and Japanese technology of advanced agricultural countries, is used to prevent the temperature of steam from being rapidly lowered, and the technology, which transfers heat into the soil, is used to implement the disinfection effect with low-cost and high-efficiency in which the heat transfer upward as the law of nature is the application technology used to kill more than 90% of pests and the like.

BEST MODE

Mode for Invention

Hereinafter, exemplary embodiments of the present technology will be described in detail with reference to the accompanying drawings.

The technology for killing pests, harmful bacteria and weed seeds inside the soil according to the embodiment of the present technology is a mechanical technology in which the crops are removed after harvest, moisture suitable for high-temperature steam disinfection is checked, and then the high-temperature steam soil sterilizer is provided, high-temperature steam is sprayed while crushing the soil by using a self-powered device, and simultaneously the soil temperature is maintained for a certain period of time using a cover to maintain the temperature for killing pests, harmful bacteria and weed seeds.

Figure 1:
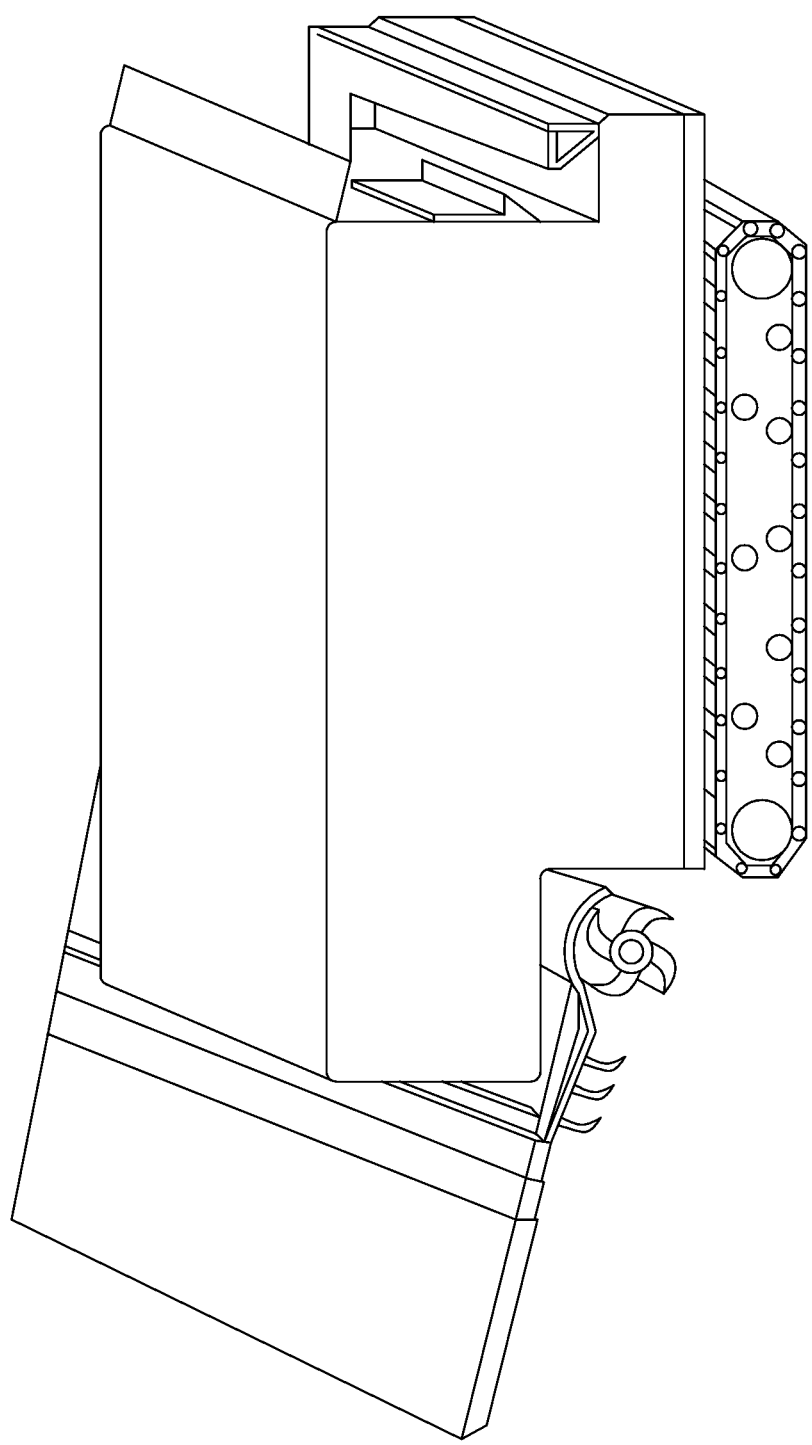
FIG. 1 is an exemplary view showing a high-temperature steam soil sterilizing device according to the embodiment of the present technology.
Figure 2:
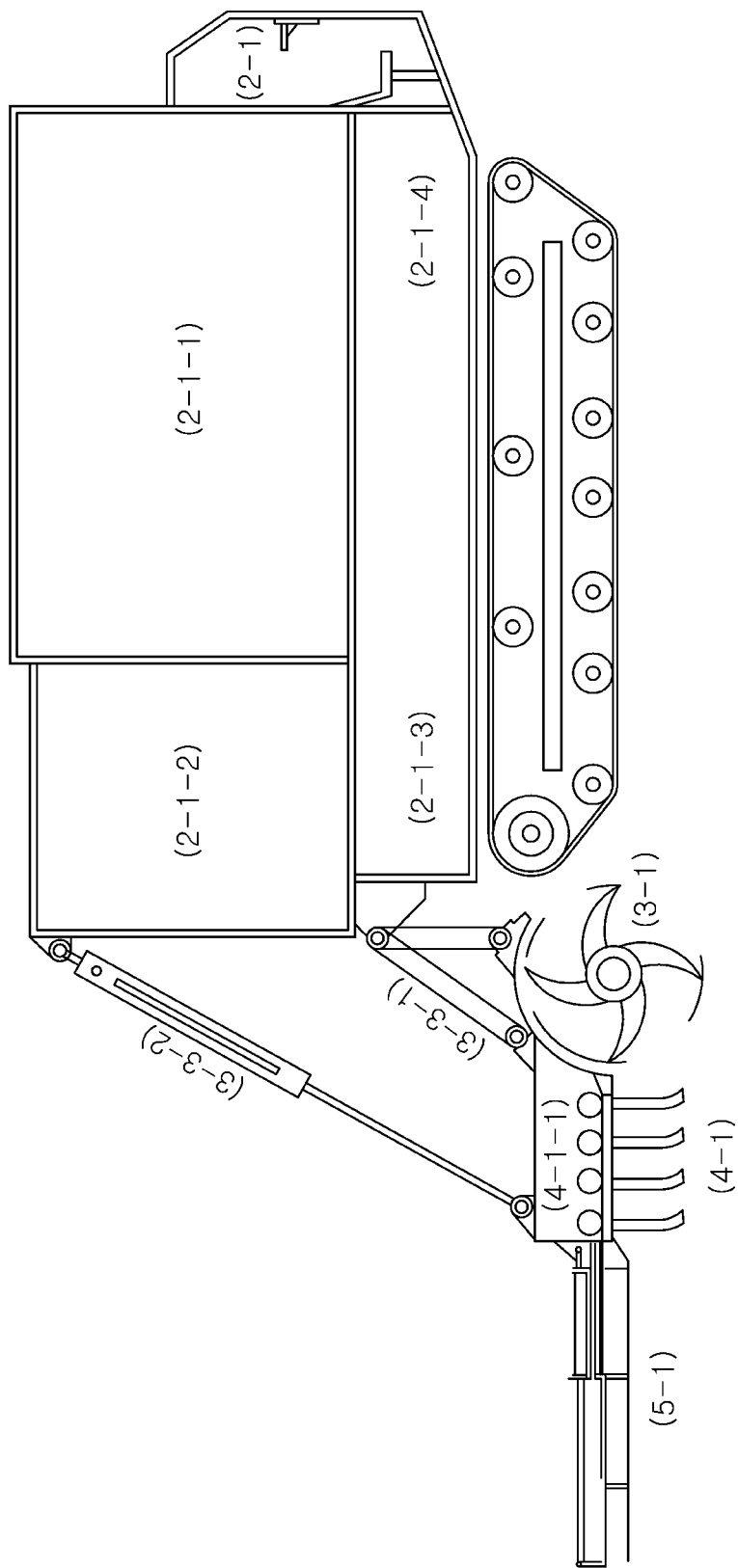
FIG. 2 is a sectional view showing the assembly state of parts constituting the high-temperature steam soil sterilizing device according to the embodiment of the present technology, and the reference numerals of the parts.
Figure 3:
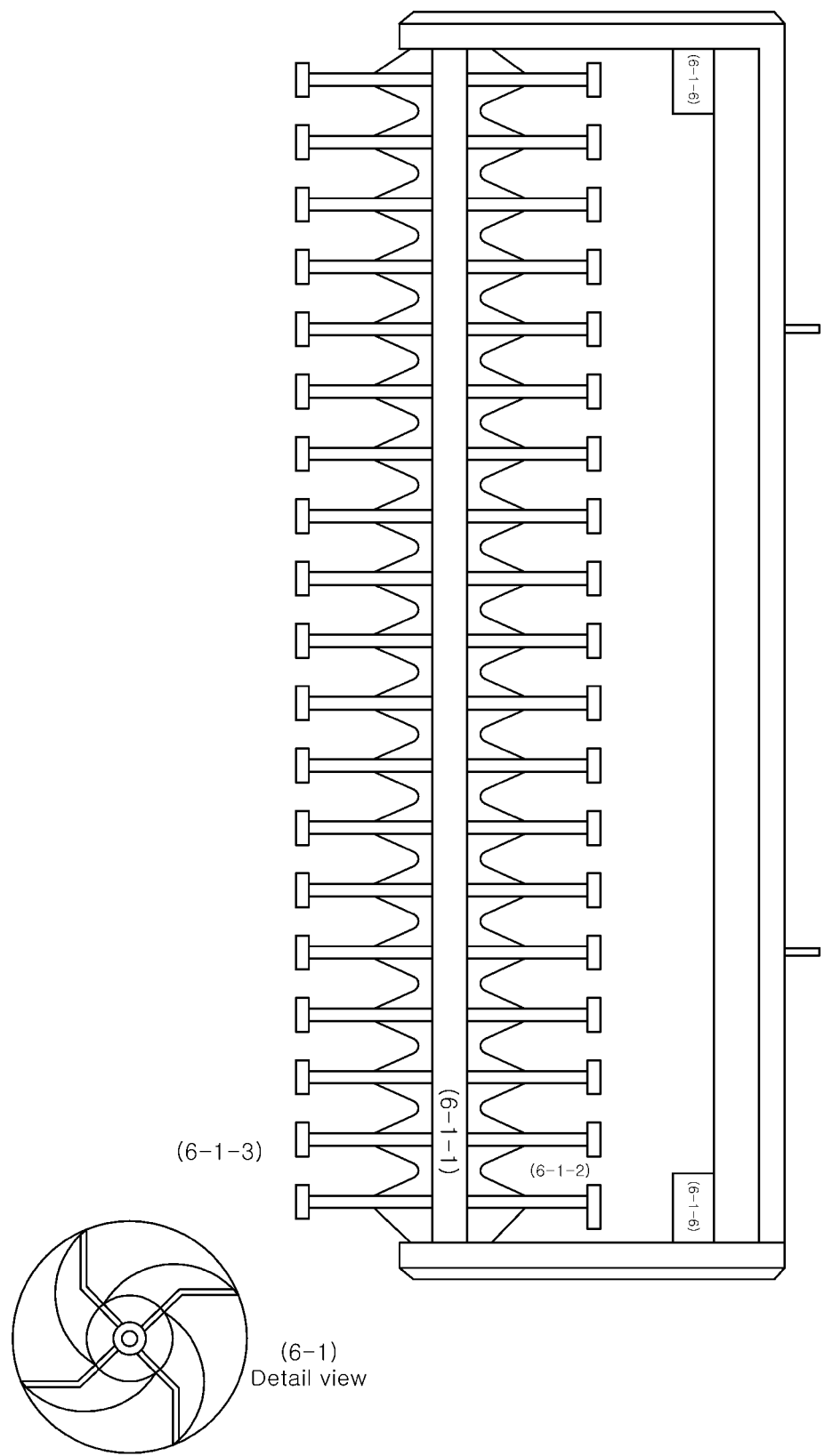
FIG. 3 shows a detailed view and a plan view of a saw blade type crusher according to the embodiment of the present technology.
Figure 4:
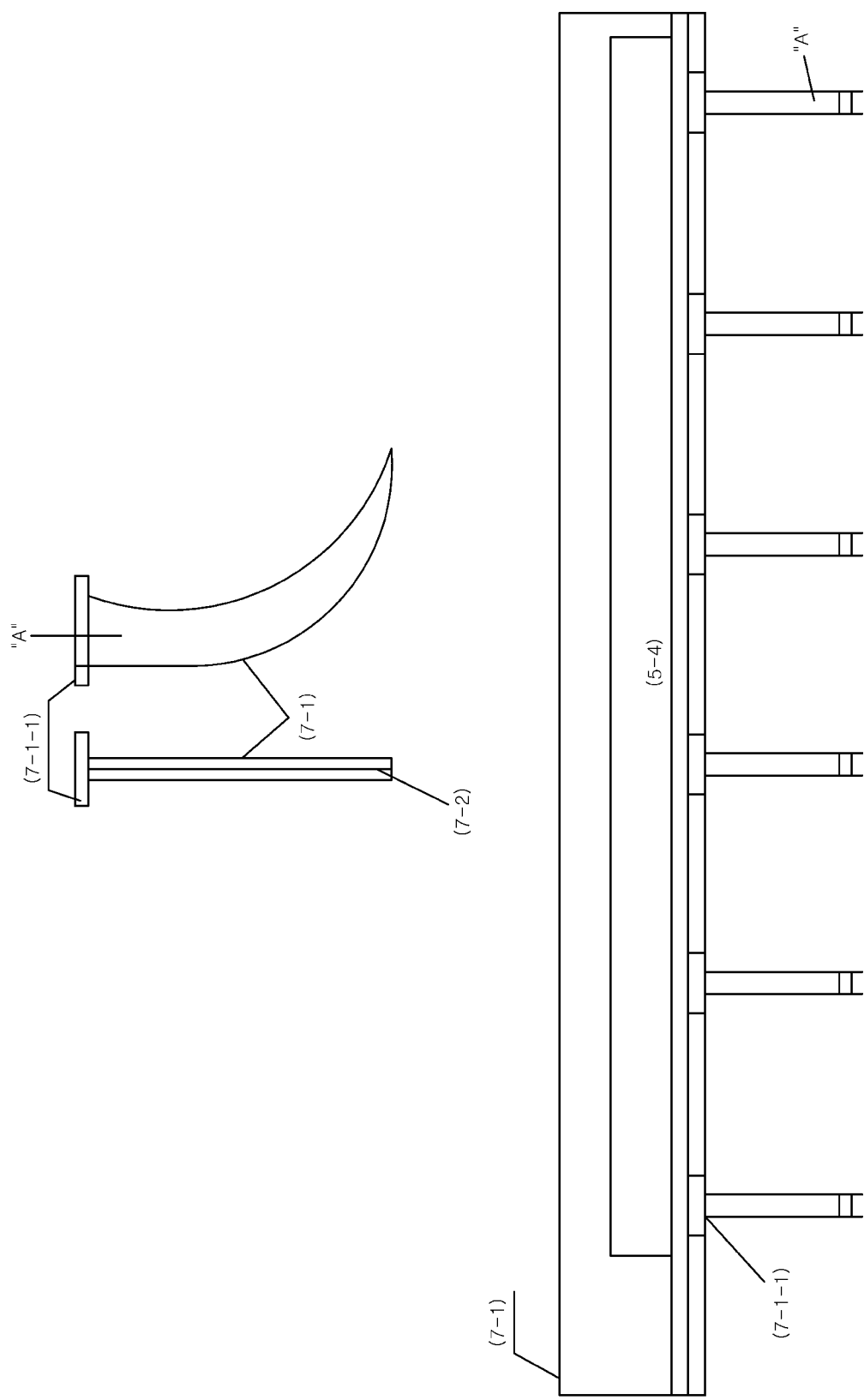
FIG. 4 shows a detailed view and a plan view of a needle rod for protecting a nozzle according to the embodiment of the present technology.

In the present technology, as shown in the schematic diagram of the high-temperature steam soil sterilizer in the example shown in FIG. 2, electricity is generated from the generator 5-1, the generated electrical energy is used to operate the hydraulic pump 5-2-1 to drive the high-temperature steam soil sterilizer, and the generated electricity operates the electric steam boiler 5-3 to generate and use high-temperature steam for the soil disinfection.

In addition, the electricity produced by the generator 5-1 activates the hydraulic pump 6-1-5 to rotate the saw blade type crusher 6-1 to crush lumps of the soil into small pieces, thereby allowing the high-temperature steam to quickly permeate between the soils. The 7-1 needle rod for protecting the nozzle 7-2 serves to protect the steam spraying from the steam outlet 7-2-1 of the nozzle 7-2 while moving forward through the powdered soil, thereby continuously applying heat of the steam to the soil. The cover 8-1 serves to band the sprayed steam to allow the high-temperature steam to permeate evenly and quickly into the soil so as to increase the temperature of the soil, thereby increasing a disinfection role of the steam.

More specifically, the present technology includes an ignition key 2-1-1, a video monitor 2-1-2, and the actuation lever 2-1-5 for actuating a caterpillar 2-2 configured to drive a soil sterilizer that are installed in the cockpit 2-1, a needle rod 7-1 and a nozzle 7-2, a saw blade type crusher 6-1, a control lever 2-1-6 for vertically controlling a cover 8-1 and the like, a control lever 2-1-7 for folding and unfolding the cover 8-1, and an ignition key 2-1-1 for the generator.

The present technology is a mechanical technology configured that the generator 5-1 is operated using the power system to produce A/C electricity, the electric energy is used to operate the soil sterilizer and actuate the electric steam boiler 5-3 to produce steam, the high-temperature steam is reheated from the re-heater through the high-pressure steam hose 5-3-5, high-temperature steam having standard pressure with a designed diameter is sprayed into the soil from the steam outlet 7-2-1 of the nozzle 7-2 protected by the needle rod 7-1 to increase the soil temperature, and the soil is covered with the cover 8-1 to maintain the temperature of high-temperature dry steam for a predetermined period of time to implement the banded steam, so that the pests, harmful bacteria and weeds are maximally killed.

The electric motor 6-1-4 is actuated with pre-produced electric energy to operate the hydraulic pump 6-1-5, and the hydraulic pressure rotates the hydraulic motor 6-1-6 to actuate the saw blade type crusher 6-1, thereby softening the soil particles so as to allow the steam to quickly penetrate between the soil particles, such that the effectiveness of soil disinfection is increased.

The needle rods 7-1 are required to be arranged in a multi-level to maintain the high temperature of the soil, insulation materials 7-1-4 are required to be inserted between the needle rods 7-1 and the nozzle 7-2 to reduce heat loss, and the needle rod 7-1 is required to be streamlined to reduce friction with the soil.

In the present technology, the cover 8-1 formed of heat reserving materials and folded in a multiple step serves to maintain the temperature of the steam sprayed in the soil for a predetermined period of time as described above so as to maintain the temperature of the soil for a predetermined of time, and the unfolding and folding device 8-2 is installed on an upper part of the cover 8-1.

In other words, the present technology is a researched and developed mechanical technology that enables a user to manipulate in the cockpit 2-1 while watching the video monitor 2-1-2, controlling the high-temperature steam soil sterilizer, checking the temperature of the heat detection monitor 2-1-3, and analyzing the killing of pests, harmful bacteria, and weed seeds.

INDUSTRIAL APPLICABILITY

Regarding to the soil disinfection development technology of the present invention, the existing chemical pesticides, herbicides, and fumigants, which are the main factors of destructing the natural environment, have been sprayed to kill harmful insects, harmful bacteria and weed seeds. A lot of money and time and continuous crops damage due to the degradation of the soil cause many disruptions in the supply and demand of food, and thus thereby causing difficulty to farmers.

The advanced agricultural countries, for more than 100 years, and Japan, the neighboring country, for more than 60 years have researched the eco-friendly steam disinfection technology to prevent soil contamination from chemical pesticides. Since received the invitation to the research project at one of the world's leading agricultural universities the high-temperature steam soil disinfection research project of UC Davis University and ASSA Agricultural Soil Steam Association, USA, 2011-2021 on the present technology 3 years ago, the inventors were interested in export. The high-temperature steam soil sterilizer for greenhouses researched and developed by the inventors was demonstrated and tested in a large American farm for 30 days from Aug. 17 to Sep. 16, 2020. The present technology has exhibited low-cost and high-efficiency ahead of other developed technologies in the world.

It is said that the cost of chemical pesticide soil disinfection in California in the United States is over 40 trillion dollars a year, which means that the soil disinfection method in Korea as well as the global market is required to be changed.

When the traditional disinfection is shifted into the high-temperature steam disinfection, the eco-friendly disinfection may be conducted at ½ the cost of chemical pesticides, The sterilization with high-temperature steam may increases the amount of harvest, the natural environment may also be protected, and it may be good for the health of farmers and the health of consumers as well.

The present technology is the world's first paper published on MDPI, the international journal of environmental health in Switzerland on July 2020 for eco-friendly pesticide-free high-temperature steam soil disinfection, and the present technology was confirmed to be the best technology.

It is the mechanical technology capable of increasing productivity at half the cost of chemical pesticides to disinfect the soil, conducting the eco-friendly high-temperature steam soil sterilization, and increasing the high-efficiency more than 50% productivity with one equipment and low cost and it is a mechanical technology for contributing to the health of farmers and consumers.

DESCRIPTION OF REFERENCE NUMERALS (2-1) Cockpit
(2-1-1) Ignition key
(2-1-2) Video monitor
(2-1-3) Heat detection monitor
(2-1-5) All directional control lever
(2-1-6) Vertical crusher, needle rod, cover control lever
(2-1-7) Unfolding and folding cover control lever
(2-2) Caterpillar
(2-2-1) Sprocket
(2-2-2) Ideal roller
(2-2-3) Tension adjustment bolt
(2-2-4) Lower roller
(2-2-5) Upper roller
(3-1) Water tank
(3-1-1) Water pump
(3-1-2) Draining valve
(3-1-3) Water softener
(4-1) Fuel tank
(4-1-1) Draining valve
(5-1) Generator
(5-1-1) Engine
(5-2) Electric motor
(5-2-1) Hydraulic pump
(5-2-2) Hydraulic motor
(5-2-3) Hydraulic hose
(5-3) Electric steam boiler
(5-3-1) Control box
(5-3-2) Heater fixing bolt
(5-3-3) Heater gasket (5-3-4) Electric heater
(5-3-5) High pressure steam hose
(5-4) Re-heater
(5-4-1) Assembly bolt
(6-1) Saw blade type crusher
(6-1-1) Shaft
(6-1-2) Saw blade
(6-1-3) Saw blade tooth
(6-1-4) Electric motor
(6-1-5) Hydraulic pump
(6-1-6) Hydraulic motor
(6-1-7) Hydraulic hose
(7-1) Needle rod
(7-1-1) Needle rod frame connection part
(7-1-2) Needle rod nozzle inlet
(7-1-3) Needle rod heater connection part
(7-1-4) Insulating material
(7-1-5) High temperature sensor
(7-1-6) Intermediate temperature sensor
(7-1-7) Low temperature sensor
(7-2) Nozzle
(7-2-1) Steam outlet
(7-2-2) Steam outlet connection part
(7-2-3) Outlet connection screw part
(8-1) Cover
(8-1-1) Hydraulic motor
(8-1-2) Wire rope
(8-1-3) Wire-wound rod
(8-1-4) Wire clip
(8-2) Unfolding and folding device

The invention claimed is:
1. A mechanical technology device for killing pests, harmful bacteria and weed seeds using steam comprising:
an electric steam boiler comprising a hose pipe;
a heater comprising an electric coil;
a plurality of electric motors;
a hydraulic motor;
a hydraulic pump;
a saw;
wherein the device is configured such that the hydraulic motor is able to rotate the saw to loosen the soil;
a plurality of steam outlet nozzles and a plurality of needle rods, wherein each outlet nozzle of said plurality of outlet nozzles comprises a corresponding needle rod of said plurality of needle rods;
wherein each steam outlet nozzle is in each said corresponding needle rod, wherein each corresponding needle rod has a hole formed on the inside, and an outside connected to a steam outlet connection part and an outlet connection screw part and a screw, and, each needle rod further comprises three temperature sensors;
wherein each outlet nozzle is configured such that steam is able to have a temperature increase by adjusting pressure of the steam by adjusting a diameter of corresponding steam outlets;

wherein the device is configured to constantly monitor soil temperatures and adjust steam temperatures according; and wherein the device is configured such that steam is able to penetrate into soil at −50 cm from a ground surface, such the steam heats the soil at an instantaneous temperature to cause a disinfection effect.

2. The mechanical technology device of claim 1, wherein one electric motor of said plurality of electric motors is configured that when activated, uses pre-produced electrical energy to operate the hydraulic pump, the hydraulic motor is rotated with hydraulic energy, and a rotary power thereby rotates the saw to crush the soil into dust, so that steam penetrates into the soil.

3. The mechanical technology device of claim 1, further comprising a cover comprising an unfolding and folding device configured to allow steam to stay in the soil for a predetermined period of time so as to maintain a temperature, wherein the temperature is monitored in a cockpit.

* * * * *